April 9, 1963

T. R. THOMAS 3,084,763

LUBRICATING PUMP

Filed Feb. 1, 1960

INVENTOR
*Thomas R. Thomas*
BY
*Dean Fairbank & Hirsch*
ATTORNEYS

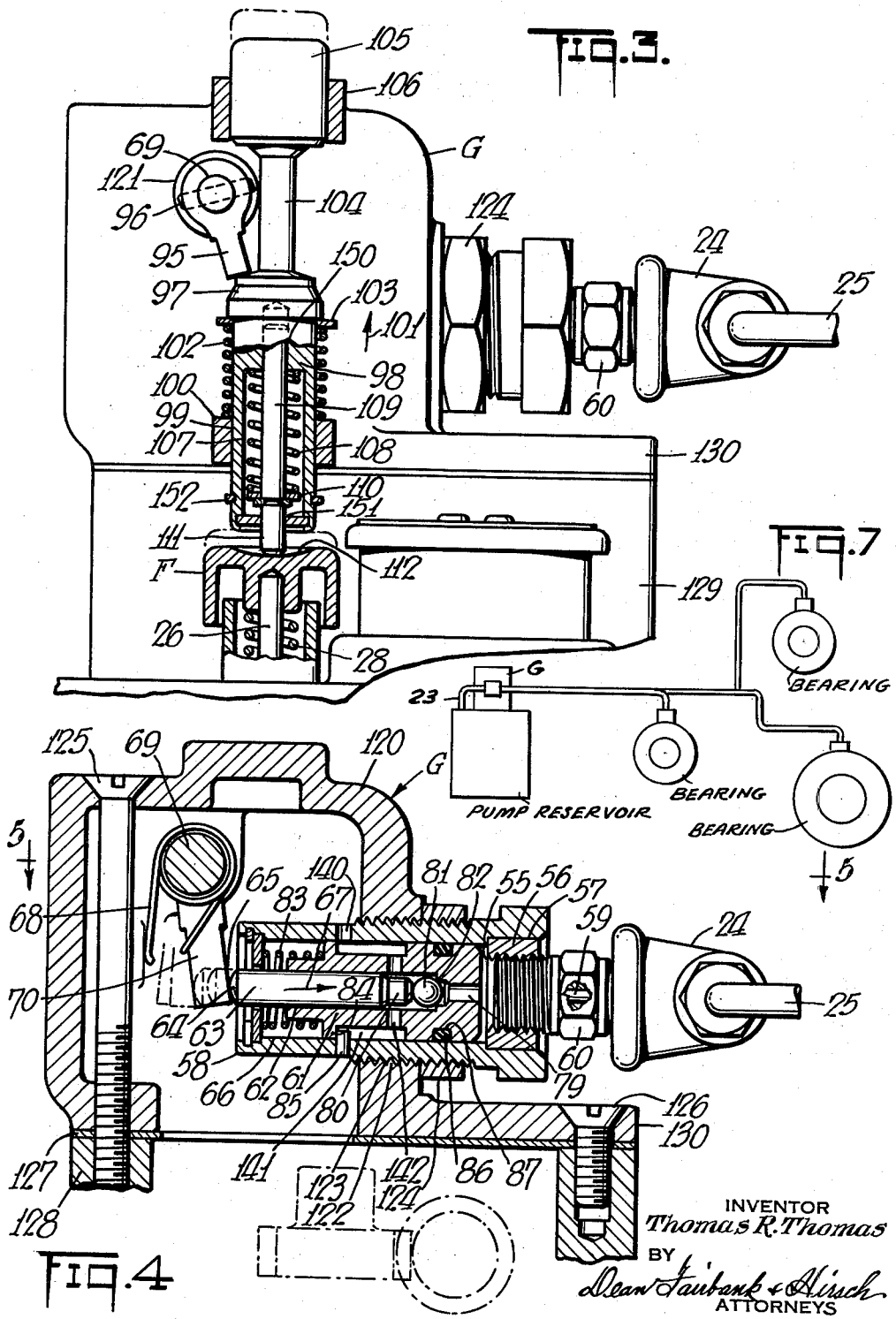

April 9, 1963     T. R. THOMAS     3,084,763
LUBRICATING PUMP
Filed Feb. 1, 1960     3 Sheets-Sheet 3
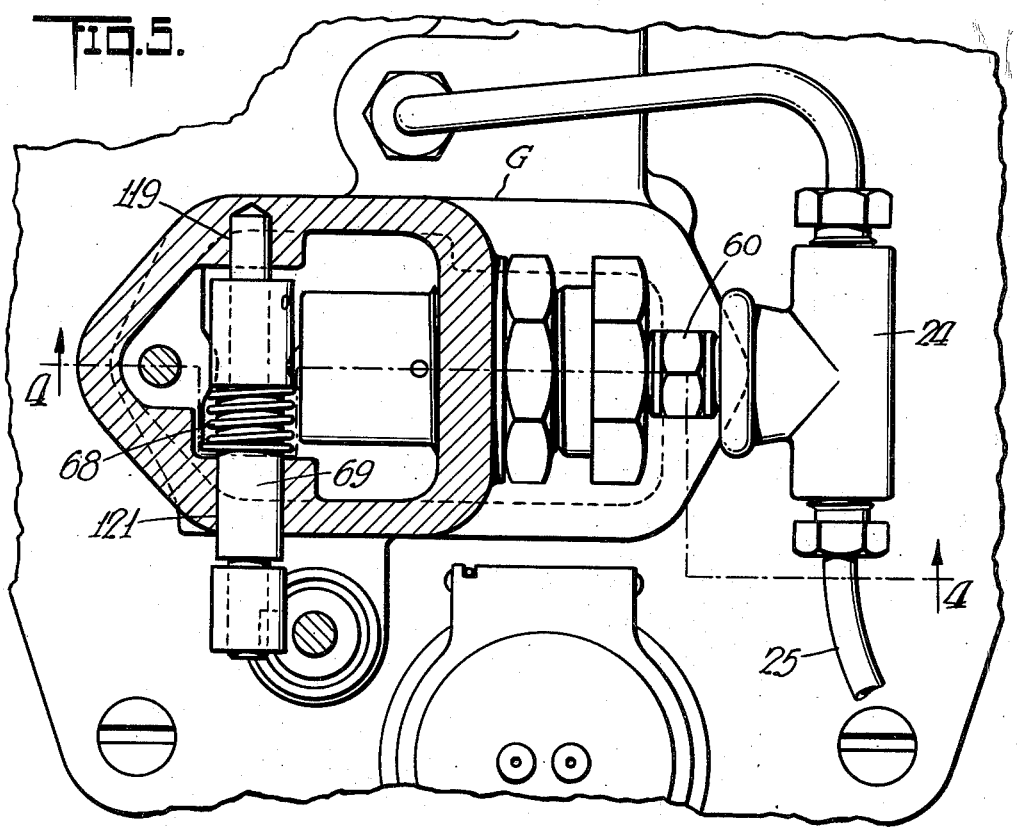
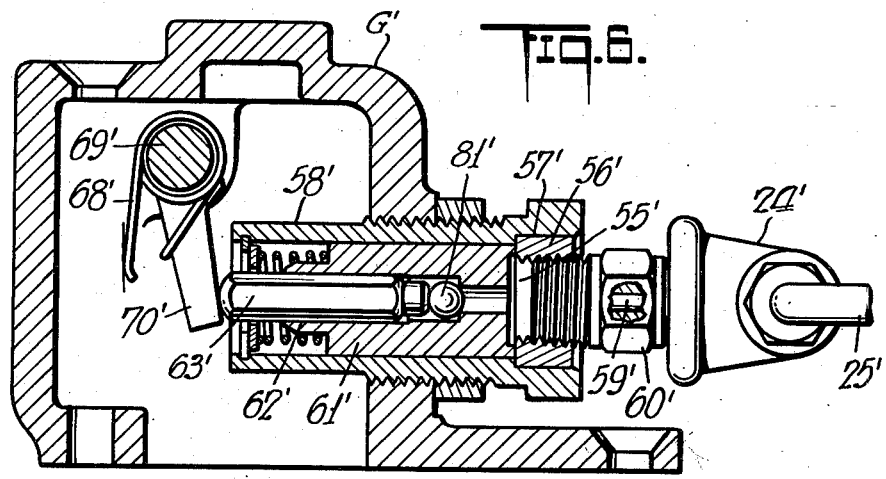
INVENTOR
*Thomas R. Thomas*
BY
*Dean Fairbank & Hirsch*
ATTORNEYS

United States Patent Office 3,084,763
Patented Apr. 9, 1963

3,084,763
LUBRICATING PUMP
Thomas R. Thomas, New York, N.Y., assignor to Auto Research Corporation, Dover, Del., a corporation of Delaware
Filed Feb. 1, 1960, Ser. No. 5,821
7 Claims. (Cl. 184—27)

The present invention relates to lubrication, and it particularly relates to a central lubricator for feeding lubricant into a branch distributing conduit system.

Although not limited thereto, the present invention will be particularly described in its application to a branched distributing lubricating system for a mechanism having a plurality of bearings requiring accurately metered, yet relatively minute quantities of lubricant per unit operation period and in which a predetermined charge of lubricant per unit time is forced into the inlet of the lubricating installation, which predetermined charge is proportioned and distributed by high restriction flow metering outlet fittings, which always have so great an obstructing effect upon the flow of lubricant that they in themselves predominantly control the distribution and proportionment of the minute quantities of lubricant to the various bearings, regardless of varying obstruction effects which are encountered in the bearings and tubing system.

It is among the objects of the present invention to provide an instant feed system for lubricating systems of the character described which, after manually started, automatically and without manual intervention stop a desired initial short of lubricant to a mechanism, so that there will be assurance of adequate lubrication when the machine is started, even though it may have been shut down over prolonged periods of time.

Another object is to provide an inexpensive reliable attachment which may be readily applied to or associated with the lubricant pressure source of lubricating installations of the character described and which will give a desired excess feed of lubricant at a desired time without thereafter affecting the regulated and predetermined feed of lubricant to the bearings during normal operation after the machine has once been started.

Another object of the present invention is to provide a feed control for lubricating installation of the character above described which will correct the feed of oil so as to accommodate lubricant requirements upon starting of the machine without unduly burdening the machine operator, and which will also serve as an indicator to indicate defects in the system requiring servicing thereof.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory, according to one embodiment of the present invention, to provide a piston timer, hydraulically controlled, which in turn will be associated with an instant feed actuator for operating the pressure source to give an excess flow of lubricant at predetermined periods and particularly when the machine is to be started.

In a basic construction, the central lubricant pressure source is a continuously operating gear pump, the oil discharge of which is normally returned to the reservoir containing the lubricant supply, but which discharge is diverted from returning to the reservoir at definite brief intervals to a distribution system.

The timing mechanism usually consists of gearing and cams driven by the machine which is being lubricated.

In addition to this automatic control to give cycles of lubrication at short periods of predetermined intervals, a manually or automatically operated arrangement may be provided to divert the output of the pump into the distribution lubricating system independent of the automatic timing mechanism consisting of a cam and gear train arrangement.

In the preferred arrangement, a tappet is provided which is actuated by lubricant pressure from the distribution system, which in turn will operate a rocker arm against a spring.

This rocker arm will be connected to a second locking arm which will, when actuated, lock a manually actuated device in position to cause instantaneous relatively high feed of lubricant to the distribution system.

After a predetermined time there will be a release which will cut off the feed of lubricant and again result in regulated feed of lubricant in accordance with the bearing requirements.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings, wherein like reference characters denote corresponding parts throughout the several views:

FIG. 3 is a side elevational and partial sectional view upon line 3—3 of FIG. 2, and upon an enlarged scale of the hydraulic piston timer.

FIG. 4 is a transverse sectional view upon the line 4—4 of FIG. 2 and upon an enlarged view as compared to FIG. 2 and also upon line 4—4 of FIG. 5.

FIG. 5 is a transverse horizontal sectional view upon the line 5—5 of FIG. 4.

FIG. 6 is a transverse sectional view similar to FIG. 4 showing an alternative construction.

FIG. 7 is a schematic showing of the lubricating system of the instant invention.

Figure 2:
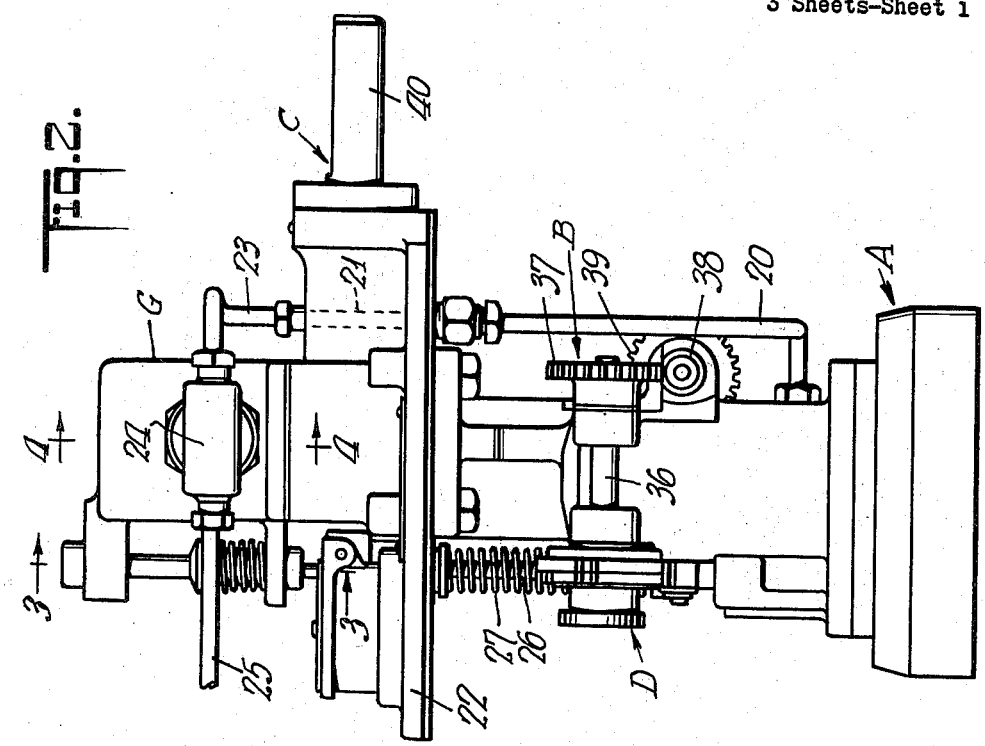
FIG. 2 is a side elevational view taken from the line 2—2 of FIG. 1.
Figure 1:
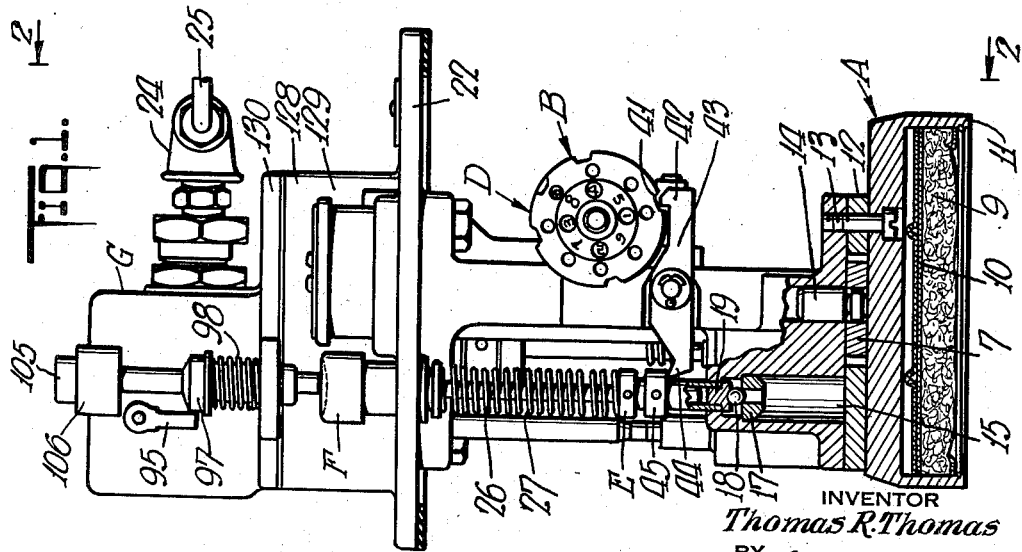
FIG. 1 is a side elevational view of a combined gear pump pressure source unit for a lubricating installation indicating the application of the automatic hydraulic piston timer of the present invention, as applied to a manual instant feed button.

Referring to FIGS. 1 and 2, there is shown a gear pump unit A having a cam and gearing control B with a drive mechanism C.

The drive system is provided with a control cam D which operates a vertically reciprocable valve control device E to alternately close and open a return flow from the gear pump A into the reservoir of the machine.

The valve control system E may normally be operated by the manual feed button F to give optional shots of lubricant when the machine is started.

The present invention is particularly directed to the hydraulic piston timer for release of the instant feed button F which is indicated at G.

This mechanism G is shown in small scale in FIGS. 1 and 2, and in large scale in FIGS. 3, 4 and 5, and also in alternative form in FIG. 6.

The invention of the present application is particularly directed to the hydraulic piston timer for release of the instant feed button as indicated at G.

Referring first to the pump and associated mechanism, the pump A has an inlet strainer 9 and filter screens 10 which are held in the cup or housing structure 11.

This cup structure 11 is mounted by four bolts such as 13 upon the plate 12. The plate 12 has recesses which receive the intermeshing gears 7 of the pump A. These gears have shaft elements 14.

The pump will normally draw lubricant from the reservoir through the strainer or filter 10 and discharge it into the chamber 15.

In the upper end of chamber 15 is inserted the valve seat 17 which is provided with a ball check 18.

When the ball check is off its seat, the lubricant discharged by the gear pump A will flow back into the reservoir and not into the external distribution system.

When, however, the ball check 18 is pressed down against its seat by the mushroom sleeve or element 19, the lubricant will be forced under the pressure created by the gears 7 into the tube 20 and then into the passageway 21 through the cover 22.

The lubricant will then pass by the tube 23 through the junction 24 and into the external distribution system 25.

When the valve 18 has to be closed to provide instantaneous flow at the initiation of operation of the machine, the button F is pressed down, and this will press down the rod 26, and in turn press down the mushroom element 19 to force the ball check 18 against the seat 17.

A spring 28 will normally return the button F to its upper position and release the ball check 18 when the manual pressure on the button is released, permitting the lubricant thereafter to flow back again into the reservoir.

In automatic operation the cam D is driven by the shaft 36 through the gearing 37, 38, 39, originating from the shaft 40, which is connected to some machine part.

When the cam recess 41 comes opposite the nose 42 on the lever or cam follower 43, the claw or nose 44 will release the collar 45, permitting the spring 27 to press the ball check 18 against the seat 17 and preventing free return of lubricant to the reservoir.

As a result, when the lever 43 is in position, as shown in FIG. 1, the lubricant will be forced into the distributing system 25 past the junction 24.

In the hydraulic piston timer for release of the instant feed button, as shown in FIGS. 3, 4 and 5, the lubricant pressure which is transmitted through the junction 24 will be fed into the chamber 55 inside of the threaded sleeve 56, which is press-fitted in an oil tight manner into the recess 57 in the cylinder element 58.

The lubricant which flows into the chamber 55 will flow through the high restriction pin-in bore 59 in the high restriction flow-metering fitting 60. This fitting is screwed into the junction 24.

Inside the cylinder 58 there is fitted the unit 61, which has an elongated recess 62 receiving the tappet 63. The tappet 63 has an extension 64, which will contact the end 65 of the lever 70. The tappet 63 will normally be unloaded or floating, except when, under the influence of manual actuation, it is pressed inwardly in the direction indicated at 67 by the spring 68 encircling the shaft 69 of the lever 70.

The tappet 63 has a reduced diameter extension 80 which presses the ball check 81 against the seat 82.

The reciprocatory unit 61 is normally pressed in the direction 67 by the spring 83, which will press the shoulder or extension 84 against the stop stud 85 in the wall of the element 58.

The rubber ring of circular cross-section indicated at 86, fitting in the groove 87, will seal the inside of the cylinder 66.

Normally, as the lubricant flows through the flow restriction metering fitting 60 into the chamber 55, it will press the outer piston 61 opposite the direction 67 and will also press the ball check 81 against the lever 70 and the spring 68 via tappet 63. When this occurs, the lever 70 will move to the dot-and-dash position, as indicated at the left of FIG. 4.

On the same shaft as the lever 70 will be the external lever 95, which is pinned in position at 96 to said shaft 69. Normally the lever 95 is in the position alongside the head 97 of the reciprocatory guide element 98 as indicated in FIG. 1.

The element 98 has a bearing at 99 in the collar 100, and it is biased in the direction 101 by the coil spring 102.

The coil spring 102 will react against the washer 103 fitting under the enlarged head 97.

The head 97 extends upwardly through the reduced diameter 104, which in turn connects with the loading button 105.

The loading button 105 has a bearing guide or ring element 106.

Inside of the element 98, there is a recess 107 which receives the spring 108, which encircles the rod 109.

The rod 109 encases the washer ring 110 against which the spring 108 reacts.

The extension 111 of rod 109 will press against the recess 112 on top of the manual instant feed button F.

The unit thus described is enclosed in a casing or housing 120, which has bearings at 119 and 121 for the shaft 69, and which is also threaded at 122 to receive the exterior threaded portion 123 of the piston enclosure or cylinder 58.

The locking nut 124 holds the cylinder 58 in position.

The housing 120 is held in position by the bolts 125 and 126 which clamp the gasket 127 in position against the top structure 128 of the enclosure 129 for the drive gearing arrangement of the pump.

The flat plate 130 will fit closely against the gasket 127 and will act to seal the top of the drive gear housing 129.

In operation the seating of the cam B will normally control the frequency of the lubricating cycle, which will be coordinated with the machine shaft to which the element or shaft 40 is connected.

The frequency of lubricating may range from 4 minutes to 35 minutes, or from 75 minutes to 350 minutes, depending upon the intervals at which lubricant should be supplied to the bearings.

The discharge may range from 32 cubic centimeters per cycle down to 8 cubic centimeters per discharge, with each cubic centimeter giving a discharge of about thirty drops. This is equivalent to a discharge per hour ranging from 2 to 300 cubic centimeters, all of this work being controlled by the particular mechanism being lubricated and the number of bearings which are connected in the lubricating line.

In a normal operation, the cam B will be set so that it operates once in a period of 25 minutes.

The manual button F normally is operated at the commencement of the day, when the machines are started, or at intervals during the day after a lay-off or recess period, or even at times when a sudden load is placed upon the mechanism being lubricated.

The particular function of the hydraulic piston timer for the instant feed button F is to enable one operator to set one or a plurality of instant feed buttons, so that such buttons F will be held down, assuring that there will be an instantaneous feed of lubricant when the machines are started again, and at the same time giving assurance that, without manual intervention of the operator, the instant feed buttons will be released and the normal cycling lubricating procedure will thereafter continue.

The device of the present invention is particularly satisfactory where at the beginning of the working day the operator must perform numerous tests and should be relieved of concern over the initial oiling of the machine, and particularly where one operator has to start several machines such as printing presses, which may be equipped with a number of lubricators, such as described in connection with FIGS. 1 and 2.

The operator can be assured, by pressing down on the button 105 and locking down the knob 97 by the lever 95, that there will be an instant feed for 15 seconds to as long as a minute, which feed will be automatically discontinued.

Thereafter the lubricating cycle will operate in a predetermined fashion.

In operation, the operator, either the night before upon shut-down or in the morning before commencement of operation, will press down the button 105 changing the position from that shown in FIG. 1 to that shown in FIG. 3.

The spring 68 will then throw over the lever 95 so it rests on top of the knob 97 and holds down the rod 109 with extension 111, which in turn holds down the instant feed button F.

At this time the spring 68 will have pressed the inside piston 63 and ball check 81 in the direction 67, and the lever 70 will be in solid line position, as indicated, with outside piston 61 held in position by the spring 83.

When the machine is started, the lubricant will then flow under pressure through the lines 20, 23 and 25, and will also flow into the chamber 55, gradually forcing the piston 61 and tappet 63 to the left, which will take a time varying from 15 seconds to one minute, depending upon the restriction of the pin-in bore 59.

This will move the lever 70 to the dot-and-dash position in FIG. 4, with the external lever 95 changing from the position of FIG. 3 to the position of FIG. 1.

In turn, as the end of the lever 95 goes off the head 97, the spring 102 will force the head upwardly and return the button 105 from solid line position in FIG. 3 to dot-and-dash position in FIG. 3, thus discontinuing the instantaneous feed, or as shown in FIG. 1.

In the alternative construction of FIG. 6, the primary variation is in the piston or tappet 63', which is of hexagonal cross-section, while the cylinder 58' does not have the relief passage 140 which cooperates with the cylinder recess 141.

In FIG. 4, the use of the round tappet 63 requires the cylinder recess 141 together with the passages 140 and 142, to relieve the lubricant pressure from the chamber 55.

The use of the hexagon tappet 63' in FIG. 6, instead of the round tappet 63 as in FIG. 4 requires no provision of draining holes such as 140 and 142 nor a recess such as 141, because the oil pressure can find relief along the flat portions or sides of the hexagon shape.

In addition to serving as a hydraulic piston timer for the instant feed button, the device G will also serve to indicate if there is no oil in the reservoir, or if there is a broken oil line, or if there is a broken flexible hose, or if there are loose tubing connections in the system.

It will also indicate if there is a clogged filter or a broken drive belt or shaft or sheared or broken gear shafts or drive pins in the lubricator of FIGS. 1 and 2.

In each of these instances the pressure will fail to build up and the lever 95 will not be released from the knob 97, indicating that servicing is required.

When oil pressure builds up in the pump, the ball valve 81 and the tappet 63, together with the piston 61, will transmit motion to the rocker arm or lever 70 against the spring 83 and the spring 68, to release the instant feed button F.

Although the piston 61 is shown as having a circular rubber sealing member 86 in the recess 87, in FIG. 4, it may have instead a very close fit, as shown in the alternative construction of FIG. 6. The push rod 109 has a loose fit inside of the guide structure 98, and it has bearings at the positions 150 and 151.

The spring 108 inside of the recess 107 of the guide member 98 and encircling the push rod 109 will exert about the same force against the button F as the cyclic feed or timing valve spring 27 will exert when the pump is on its automatic cycle shot.

The spring 102, reacting between the bearing member 100 and the washer 103, has sufficient force to move the head 97 upwardly into a wedging action against the force exerted on the oblique portions of the top of the head through the torque action of the spring 68 upon the shaft 69 and the arm or lever 95 which acts as a button lock arm.

The retaining ring 152 will limit upward movement of the guide member 98, which is moved together with the loading button 105, the spring 102 normally biasing the head 97 and the loading button 105 into uppermost position, as shown in FIG. 1, with the button lock arm 95 to the left and in inoperative position.

The lost motion of the element or push rod 109 will permit the lock lever arm 95 to be pressed over the head 97 until it is in the position indicated in FIG. 3 by the torque of the spring 68.

In this position, both the springs 102 and 108 will be held in compressed or stressed position, and at the same time the tappet 63 will press the ball check 81 against the seat 82 under pressure or load of spring 68 sealing off any flow through the passageway 79 of the piston 61.

In summary, it may be assumed that the gear pump A has been operating to feed lubricant at intervals predetermined by the cam arrangement B and the drive arrangement C to the mechanism through the outlet tube 25.

Normally the lubricant from the gear pump A will flow to the reservoir and pass the valve seat 17 and the valve 18 as the nose 42 of the lever 43 rides on the outside edge of the cam arrangement B.

During this period, the claw or nose 44 of the lever 43 will free or release element 19, permitting the ball valve 18 to bypass lubricant.

However, as soon as the nose 42 is received in the recess 41, the ball check 18 will be seated by the spring 27, forcing the lubricant to flow into the tube 20 and then into the external system through the tubing 25.

This may also be accomplished manually by pressing down on the manual feed button upon starting, or at any other time, which will press the ball check 18 against the valve seat 17, even though the nose 42 has not been received in any recess.

With the present hydraulic piston type timer, as shown in FIGS. 3, 4, 5 and 6, the operator need not hold down manually several feed buttons F upon commencement of operation, but instead he can press down a series of the buttons F by means of the push element 105 when the lubricant pressure is off the system either after the machines have been shut down for overnight, for a week-end or for a holiday, or before the operation is commenced in the morning or after a shutdown of greater or shorter duration.

In such case, the lever 95 will move into position over the head 97, holding it down in the manner indicated in FIG. 3.

The lever 95 will only be released when lubricant pressure has again built up into the system and sufficient pressure has been passed through the high restriction flow meter fitting 60 to displace the piston 61 of FIG. 4 or 61' of FIG. 6 to the left, releasing the lever 95 and permitting the head 97 to spring back.

FIG. 7 shows the pump reservoir having the tube 23 and the hydraulic piston timer G of the instant invention through which the lubricant will pass as it is pumped to the plurality of remote, spaced bearing elements via the branched distributing conduit system.

The ball checks 81 and 81' of FIGS. 4 and 6 respectively are normally pressed against the seat 82 by the tappet 63. However when the pressure becomes sufficiently high on the right side of the ball check 81 it will be pressed off its seat indicated at 82 in FIG. 4 and the liquid pressure will be such that the ball will be pressed to the left a substantial distance moving the left end of the piston or tappet 63 and the depending lever arm 70 to the dot and dash position shown in FIG. 4.

The time which will elapse before the pressure will build up in the chamber 55 of FIG. 4 or 55' of FIG. 6 will be controlled by the restriction of the closely fitting pin 59 in the bore after the fitting 60 in FIG. 4 or the pin 59′ in the bore of the fitting 60′ of FIG. 6.

When the lever arm 70 or 70′ is moved, it will act through the shaft 69 on the lever 95 which as shown in FIG. 3 normally is positioned on top of the knob 97.

This will release the knob 97 permitting the finger press member 105 to elevate into the dot and dash position releasing the button 112 and cutting off the initial quick or rapid lubricant feed.

In other words, when the member F of FIG. 3 is pressed down, there will be an initial continuous feed of lubricant to assure a full supply of lubricant to the bearings when the machine is started.

The present arrangement gives assurance that such instant initial feed will be achieved automatically by locking down the feed button by having the element 95 latch on top of the knob 97.

The balls 81 of FIG. 4 and 81′ of FIG. 6 so closely fit the bore in which they are located that they will cause the liquid pressure in the chambers 55 or 55′ to force them through the left together with the tappets 63 and 63′ to operate the system.

As many changes could be made in the above lubrication system, and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. In an automatically driven gear pump for a high restriction centralized lubricant distributing installation of the type having a branched distributing conduit system for feeding relatively minute, yet accurately proportioned quantities of lubricant to the spaced and distributed bearings of a mechanism requiring lubrication throughout operation, separate automatic and manual means to supply lubricant under pressure at intervals to said installation, means to preset said manual means and means to release said manual means after it has been preset, said last-mentioned means being responsive to lubricant pressure generated by said pump and said means to preset said manual means comprising a swinging locking lever to lock said manual means in position to supply lubricant when there is no lubricant pressure upon the conduit system.

2. The pump of claim 1, said release means being provided with a hydraulic release element actuated by building up of pressure in the conduit system.

3. The pump of claim 1, said pump being provided with a reservoir and also being provided with a bypass ball check valve which when not positively seated will permit flow of lubricant back into the reservoir, conduit means connecting the pump to conduct lubricant from the pump to the check valve and conduit means connecting the check valve to the reservoir, and said automatic and manual means being provided with an arrangement to seat said ball check and said presetting means serving to hold said manual means in lubricant supply condition and said release means serving to release said holding means.

4. In an automatically driven lubricant pump of the type driven by machine which requires lubricant during operation and not during shut down but which should be lubricated after each shut down upon commencement of operation having a lubricant propulsion means to supply lubricant at intervals from the pump to an external distribution line and movable manual means to cause a continuous feed of lubricant from the pump at desired periods during the intervals between lubricant supply; the combination therewith of actuating means to actuate said manual means so as to assure an initial supply of lubricant immediately upon commencement of the machine including moving means to move said manual means to cause continuous feed latching means to latch said moving means to move in position to cause continuous flow and release means to release said last mentioned means only at the end of a predetermined period, said period beginning when the machine is started, and ending when the pump creates pressure.

5. The combination of claim 4, said moving means including an auxiliary press button, said latching means including a swinging latch lever to latch the movable manual means in continuous feed position and said releasing means including a time delay piston actuated by the pressure created by the pump upon starting the machine.

6. In a central lubricant pump of the type to supply lubricant to the bearings of a mechanism requiring lubrication throughout operation and also requiring continuous lubrication upon initiation of operation after a shutdown, said pump having a reservoir for lubricant, a lubricant pump, an outlet feed from the pump to the mechanism, a return to return lubricant to the reservoir from the pump, a cut-off to cut off said return and force lubricant to flow from the pump to the outlet feed, a first drive to drive the pump from the mechanism, a second drive to the cut-off from the first drive, a third drive to drive the cut-off when the operation is initiated; the combination therewith of a latch and release to hold the third drive and release it after the operation has been initiated comprising a lever to latch the third drive and a reciprocatory release to move the lever to released position when and after the lubricant flows from the pump to the outlet feed.

7. The pump of claim 6, said third drive comprising a reciprocating hand actuated button, said lever swinging to hold said button down in cut-off position and said reciprocatory release including a piston driven by the flow to the outlet feed to release the button from the lever.

References Cited in the file of this patent
UNITED STATES PATENTS

| | | |
|---|---|---|
| 2,787,336 | Thomas | Apr. 2, 1957 |
| 2,960,185 | Klein | Nov. 15, 1960 |